US009172660B2

(12) United States Patent  (10) Patent No.: US 9,172,660 B2
Fortune et al.  (45) Date of Patent: Oct. 27, 2015

(54) SWITCH FABRIC WITH COLLECTOR-BASED CELL REORDERING

(71) Applicant: Alcatel-Lucent USA Inc., Murray Hill, NJ (US)

(72) Inventors: Steven J. Fortune, Summit, NJ (US); Spyridon Antonakopoulos, New Providence, NJ (US); Hubert Rae McLellan, Jr., Summit, NJ (US); Yihao Zhang, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 273 days.

(21) Appl. No.: 13/828,167

(22) Filed: Mar. 14, 2013

(65) Prior Publication Data

US 2014/0269684 A1  Sep. 18, 2014

(51) Int. Cl.
  *H04W 52/04* (2009.01)
  *H04L 12/947* (2013.01)
  *H04L 12/931* (2013.01)

(52) U.S. Cl.
  CPC ............... *H04L 49/25* (2013.01); *H04L 49/00* (2013.01)

(58) Field of Classification Search
  USPC .......................................... 370/355, 352, 354
  See application file for complete search history.

(56) References Cited

U.S. PATENT DOCUMENTS

| | | | |
|---|---|---|---|
| 5,127,000 A | 6/1992 | Henrion | |
| 5,260,935 A | 11/1993 | Turner | |
| 5,339,311 A | 8/1994 | Turner | |
| 6,434,148 B1 | 8/2002 | Park | |
| 6,934,760 B1* | 8/2005 | Westbrook et al. | 709/231 |
| 7,457,247 B1* | 11/2008 | Frink | 370/230.1 |
| 2002/0085578 A1* | 7/2002 | Dell et al. | 370/422 |
| 2003/0035432 A1 | 2/2003 | Sreejith et al. | |
| 2003/0112831 A1* | 6/2003 | Williams | 370/535 |
| 2004/0213151 A1 | 10/2004 | Willhite et al. | |
| 2007/0081558 A1 | 4/2007 | Shaikli | |
| 2007/0140229 A1* | 6/2007 | Tang | 370/360 |
| 2008/0279195 A1 | 11/2008 | Okuno | |
| 2010/0158031 A1 | 6/2010 | Thomas et al. | |
| 2010/0165843 A1 | 7/2010 | Thomas | |
| 2010/0189123 A1 | 7/2010 | Alfano | |
| 2010/0272123 A1 | 10/2010 | Peterson | |
| 2013/0182704 A1* | 7/2013 | Jacobs et al. | 370/357 |

OTHER PUBLICATIONS

C.-S. Chang et al., "Load Balanced Birkhoff-von Neumann Switches, Part I: One-Stage Buffering," Computer Communications, Aug. 2001, 25 pages.

(Continued)

*Primary Examiner* — Dang Ton
*Assistant Examiner* — Pamit Kaur
(74) *Attorney, Agent, or Firm* — Ryan, Mason & Lewis, LLP

(57) ABSTRACT

A network device of a communication network is configured to implement a switch fabric that includes collector-based cell reordering functionality. In one embodiment, the switch fabric comprises a plurality of distributors, a plurality of routing elements each having inputs coupled to respective outputs of multiple ones of the distributors, and a plurality of collectors each having inputs coupled to respective outputs of multiple ones of the routing elements. At least a given one of the collectors comprises a sorting circuit configured to reorder streams of cells received from respective ones of the routing elements into a single reordered stream of cells utilizing a merge sort.

22 Claims, 3 Drawing Sheets

(56) References Cited

OTHER PUBLICATIONS

C.-S. Cgang et al., "Load Balanced Birkhoff-von Neumann Switches, Part II: Multi-Stage Buffering," Computer Communications, Aug. 2001, 23 pages.

C.-S. Chang et al., "Mailbox Switch: A Scalable Two-Stage Switch Architecture for Conflict Resolution of Ordered Packets," IEEE Transactions on Communications, Jan. 2008, pp. 136-149, vol. 56, No. 1.

Cisco, "Cisco Visual Networking Index: Forecast and Methodology, 2011-2016," White Paper, May 2012, 16 pages.

S.-T. Chuang et al., "Matching Output Queuing with a Combined Input Output Queued Switch," Stanford University, Computer Systems Laboratory, Technical Report CSL-TR-98-758, Apr. 1998, 25 pages.

J.J. Jaramillo et al., "Padded Frames: A Novel Algorithm for Stable Scheduling in Load-Balanced Switches," IEEE/ACM Transactions on Networking, Oct. 2008, pp. 1212-1225, vol. 16, No. 5.

Isaac Keslassy, "The Load-Balanced Router," Stanford University, Ph.D. Dissertation, Jun. 2004, pp. 1-121.

I. Keslassy et al., "Scaling Internet Routers Using Optics (Extended Version)," Stanford HPNG Technical Report TR03-HPNG-080101, 2003, 16 pages.

Y. Shen et al., "Design and Performance Analysis of a Practical Load-Balanced Switch," IEEE Transactions on Communications, Aug. 2009, pp. 2420-2429, vol. 57, No. 8.

\* cited by examiner

SWITCH FABRIC WITH COLLECTOR-BASED CELL REORDERING

FIELD

The field relates generally to switch fabrics, such as switch fabrics that are used in conjunction with processing packets in a network device of a communication network.

BACKGROUND

A network device such as a router typically includes a switch fabric that is configurable to direct packets received at particular device inputs to particular device outputs. The switch fabric may be implemented as a load-balanced switch fabric, in which multiple parallel paths through the switch fabric are provided in order to increase its throughput capacity for a given operating rate.

In a typical conventional arrangement, input packets are separated into cells that traverse respective paths through the switch fabric and are then reassembled into output packets. However, the multiple parallel paths of the switch fabric often have different delays, possibly due to factors such as differences in queue occupancies in these paths. Accordingly, cells from the same input packet or input packet stream may experience different delays as they traverse different paths through the switch fabric. The cells can therefore arrive at switch fabric outputs in a different order than that in which they were applied to switch fabric inputs, thereby significantly complicating the reassembly of cells into output packets. This difficulty associated with load-balanced switch fabrics is commonly referred to as the cell reordering problem.

Various techniques are known in the art for addressing the cell reordering problem. Some of these techniques impose constraints on how the cells can be sent through the switch fabric. For example, one such technique requires that cells be sent through the switch fabric in uniform frames. Unfortunately, this technique can introduce significant delays in routing the cells through the switch fabric, due to the additional time required to fill the frames uniformly with cells. Also, this technique and other constraint-imposing techniques not only introduce significant delays, but also unduly restrict the configuration of the switch fabric itself. Configuration restrictions of this type can make it much more difficult for the switch fabric to accommodate other common router throughput requirements, such as multicast traffic and multiple levels of cell priority.

SUMMARY

Illustrative embodiments of the present invention provide switch fabrics having collector-based cell reordering functionality. These switch fabrics in some embodiments can advantageously avoid the delays and configuration restrictions associated with the conventional arrangements described above.

In one embodiment, a switch fabric comprises a plurality of distributors, a plurality of routing elements each having inputs coupled to respective outputs of multiple ones of the distributors, and a plurality of collectors each having inputs coupled to respective outputs of multiple ones of the routing elements. At least a given one of the collectors comprises a sorting circuit configured to reorder streams of cells received from respective ones of the routing elements into a single reordered stream of cells utilizing a merge sort. The sorting circuit may be more particularly configured to ensure that cells received from a particular one of the distributors leave the collector in the same order that they were sent from the distributor.

For example, each of the distributors may be configured to annotate each of the cells that it forwards to one of the routing elements with a key, such as a sequence number, so as to establish an order of cells forwarded by the distributor. The keys associated with respective ones of the cells are utilized by the merge sort in the sorting circuit of the given collector to maintain the order established by the distributor.

The switch fabric can be implemented in a network device such as a router within a communication network. Numerous other applications of the disclosed switch fabrics are possible.

DETAILED DESCRIPTION

Illustrative embodiments of the invention will be described herein with reference to exemplary communication networks, network devices, switch fabrics and associated processes. It should be understood, however, that the invention is not limited to use with the particular networks, network devices, switch fabrics and associated processes described, but is instead more generally applicable to any switch fabric application in which it is desirable to provide efficient cell reordering functionality.

Figure 1:
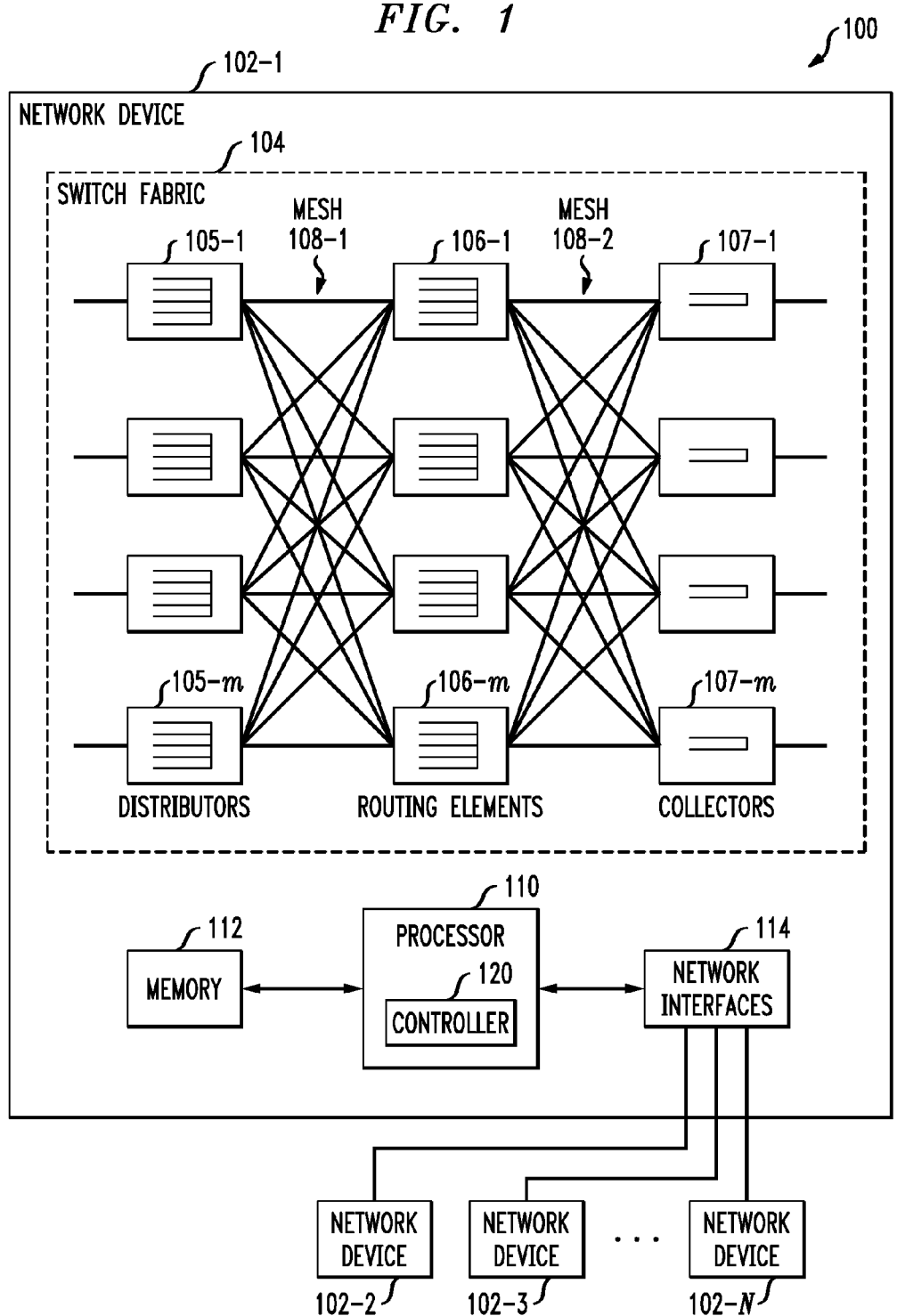
FIG. 1 shows a communication network comprising a plurality of network devices in an illustrative embodiment of the invention.

FIG. 1 shows a communication network 100 comprising a plurality of interconnected network devices 102-1, 102-2, 102-3, . . . 102-N. The network devices 102 may comprise routers, switches, servers, computers or other processing devices, in any combination, examples of which may also be commonly referred to as network nodes or terminals. A given network device will generally comprise a processor and a memory coupled to the processor, as well as one or more transceivers or other types of network interface circuitry which allow the network device to communicate with the other network devices to which it is interconnected.

As will be described in greater detail below, one or more of the network devices 102 of the network 100 are each configured to implement a switch fabric with collector-based cell reordering functionality.

A given one of the network devices 102-1 is shown in more detail than the other network devices 102 in this figure, although these other network devices may each be configured in a manner similar to that shown for network device 102-1.

The given network device 102-1 comprises a switch fabric 104 having distributors 105-1 through 105-$m$, routing elements 106-1 through 106-$m$ each having inputs coupled to respective outputs of multiple ones of the distributors 105, and collectors 107-1 through 107-$m$ each having inputs coupled to respective outputs of multiple ones of the routing elements 106. Each of the collectors 107 is assumed to comprise a sorting circuit configured to reorder streams of cells received from the routing elements 106. An example of the sorting circuit will be described below in conjunction with FIG. 2.

Although it is assumed in this embodiment that there are the same number m of distributors 105, routing elements 106 and collectors 107, this is by way of example only, and in other embodiments there may be different numbers of distributors, routing elements and collectors. For example, a switch fabric may instead comprise m distributors, m' routing elements, and m collectors, where m≠m'. In such arrangements, m would typically be greater than m', with m possibly taking on values from about 16 to 64 or even larger, and m' taking on values from about 4 to 8, although numerous other values could be used for m and m'.

It will continue to be assumed below for clarity and simplicity of description that m=m' although the disclosed techniques can be extended in a straightforward manner to arrangements in which m≠m', as well as to other arrangements, such as those in which there are different numbers of distributors and collectors.

The distributors 105, routing elements 106 and collectors 107 each include one or more queues. In this figure, the distributors and routing elements are each shown as comprising multiple queues, while the collectors are each shown as comprising a single queue, which corresponds to a reassembly queue. However, as will be more fully described in conjunction with FIG. 2, the collectors also include additional queues, more particularly referred to herein as arrival queues, that are not explicitly shown in FIG. 1, but are utilized in collector-based cell reordering.

The switch fabric 104 in the FIG. 1 embodiment may be viewed as a representative example of what is also referred to herein as a load-balanced switch fabric. As indicated above, the switch fabric 104 is assumed to comprise m distributors 105, m routing elements 106, and m collectors 107. The switch fabric further includes a first mesh 108-1 comprising $m^2$ links each configured to connect one of the distributors 105 to one of the routing elements 106, and a second mesh 108-2 comprising $m^2$ links each configured to connect one of the routing elements 106 to one of the collectors 107. In alternative arrangements in which m≠m', the number of links in each of the first and second meshes 108 would instead be given by m×m'.

It is assumed that the distributors 105, routing elements 106 and collectors 107 in the present embodiment operate in synchronization with one another using a master clock that establishes a frame interval. These switch fabric elements may be implemented using very large scale integrated (VLSI) circuitry having a clock rate that is typically determined by the cycle time of the memory used for its queues, which is usually high-speed memory such as static random access memory (SRAM). Within one memory cycle, a location of SRAM can be read or written, or data can be moved from one register to another possibly through some combinational logic. It is further assumed that the distributors, routing elements and collectors all can operate at an internal rate of one cell per cycle. Hence a frame interval in this embodiment is at least m cycles, since m cells arrive every such interval, and may be assumed to be exactly m cycles. As indicated above, this configuration assumes the same number m of distributors 105, routing elements 106 and collectors 107, such that m=m'. Appropriate adjustments would be made to the timing of the various elements in alternative arrangements in which m≠m'.

In operation, each distributor 105 receives as its input a stream of fixed-size cells, each containing at least a portion of a packet as its payload and each labeled with a destination collector 107. These input cells received by the distributors are also referred to herein as "full" cells, in contrast to "empty" cells that contain dummy payload and are generated within the switch fabric as will be described.

Every frame interval, each distributor 105 sends out one cell per link in parallel to all routing elements 106. The distributors 105 are also assumed to have the capability to create empty cells, so that every link gets a cell in each frame interval even if one or more of the distributor queues are empty.

Every frame interval, each routing element 106 receives m cells in parallel, one from each distributor 105. Each routing element 106 has m queues, one per collector 107. Cells arriving at the routing elements are placed in the appropriate queue, and empty cells are discarded.

Every frame interval, each routing element 106 sends out one cell per collector 107, where the cell sent by a given routing element to the k th collector is the cell at the head of the k th queue. Again, if a queue is empty, an empty cell is sent instead.

Each collector 107 receives up to m full cells simultaneously. Empty cells are discarded. Cells pass through the sorting circuit 200 and are then placed into the reassembly queue 206, prior to reconstruction of packets from cells.

The term "frame" in the context of this embodiment denotes the set of cells sent simultaneously, either from a distributor 105 or a routing element 106. As noted above, a master clock may be used to establish the frame intervals and is assumed to be available globally to all of the components of the switch fabric. Alternatively, the master clock may be configured to provide only a global guarantee of monotonically increasing frame sequence number, such that local asynchrony between components is permitted.

It is to be appreciated that the switch fabric configuration shown in FIG. 1 is exemplary only, and other types of switch fabrics can be used in other embodiments. For example, alternative arrangements of distributors 105, routing elements 106 and collectors 107, as well as associated interconnecting meshes 108, can be used in other embodiments. Thus, as indicated previously, in other embodiments there need not be the same number of distributors, routing elements and collectors. Also, the particular processing operations performed by these elements may vary in other embodiments.

As another example, the switch fabric 104 may be configured with each mesh 108 replaced by a cross-bar operating with a fixed pattern of m matchings, where the t th matching, t=1, . . . , m, pairs input i with output (i+t)mod m. In the exemplary frame-based arrangement of FIG. 1, m cells are sent in parallel every frame interval, while in the alternative cross-bar-based arrangement m cells are sent one-by-one during a frame interval. Subsequent description below will generally assume use of the frame-based arrangement, although it should again be understood that a wide variety of other switch fabric configurations may be used.

The switch fabric 104 and possibly other portions of the network device 102-1 may be implemented using one or more line cards. A given such line card may comprise, for example, input stage processing circuitry implementing at least a subset of the distributors 105, intermediate stage processing circuitry implementing at least a subset of the routing elements 106, and output stage processing circuitry implementing at least a subset of the collectors 107. The input stage processing circuitry of the line card may be configured to separate an input packet stream arriving at the network device 102-1 into cells for delivery to inputs of the distributors 105. The output stage processing circuitry of the line card may be configured to reassemble reordered cells from the collectors 107 into an output packet stream. Numerous other types of circuitry may be used to implement the switch fabric 104. For example, the switch fabric 104 can be implemented in the form of one or more integrated circuits without using line cards.

The network 100 may comprise any type of communication network suitable for transporting packets, and the invention is not limited in this regard. For example, portions of the network 100 may comprise a wide area network such as the Internet, a metropolitan area network, a local area network, a cable network, a telephone network, a satellite network, a data center network, as well as portions or combinations of these or other networks. The term "network" as used herein is therefore intended to be broadly construed.

In this embodiment, the given network device 102-1 may further comprise a processor 110, a memory 112 and network interfaces 114. Numerous alternative network device configurations may be used.

The processor 110 comprises a controller 120 configured to control at least portions of the operation of one or more device components such as switch fabric 104. The processor 110 may be implemented utilizing a microprocessor, a microcontroller, an application-specific integrated circuit (ASIC), a field-programmable gate array (FPGA), or other type of processing circuitry, as well as portions or combinations of such processing circuitry. The processor 110 may include one or more embedded memories that are not explicitly shown in the figure.

Also, it should be appreciated that the distributors 105, routing elements 106 and collectors 107 of the switch fabric 104 also utilize memory to implement the various queues associated therewith. As indicated above, these queues are assumed in the context of illustrative embodiments to be implemented using a high-speed memory such as SRAM, although other types of memory can be used.

The processor 110 and any associated memory such as memory 112 may be used in storage and execution of one or more software programs for controlling the operation of switch fabric 104 or other components of the network device. Accordingly, the controller 120 or portions thereof may therefore be implemented at least in part using such software programs.

The memory 112 is assumed to include one or more storage areas that may be utilized for program code storage. The memory 112 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. The memory 112 may therefore comprise, for example, an electronic random access memory such as SRAM, DRAM or other types of electronic memory. The term "memory" as used herein is intended to be broadly construed, and may additionally or alternatively encompass, for example, a read-only memory (ROM), a disk-based memory, or other type of storage device, as well as portions or combinations of such devices.

The memory 112 may additionally or alternatively comprise storage areas utilized to provide input and output packet buffers for the network device 102-1. For example, the memory may implement an input packet buffer comprising a plurality of queues for storing received packets to be processed by the network device and an output packet buffer comprising a plurality of queues for storing processed packets to be transmitted by the network device.

It should be noted that the term "packet" as used herein is intended to be construed broadly, so as to encompass, for example, a wide variety of different types of protocol data units, where a given protocol data unit may comprise at least one payload as well as additional information such as one or more headers.

Portions of the memory 112 may additionally or alternatively be utilized to implement at least a subset of the above-noted queues associated with the distributors 105, routing elements 106 and collectors 107 of the switch fabric 104.

The network interfaces 114 comprise transceivers or other types of network interface circuitry that are used to allow the network device 102-1 to communicate with the other network devices 102 of the communication network 100.

The processor 110, memory 112 and network interfaces 114 may include well-known conventional circuitry suitably modified to implement at least a portion of the collector-based cell reordering functionality of the network device 102-1 as described herein. Conventional aspects of such circuitry are well known to those skilled in the art and therefore will not be described in detail herein.

It is to be appreciated that a given network device as disclosed herein may be implemented using components and modules other than those specifically shown in the exemplary arrangement of FIG. 1.

Figure 2:
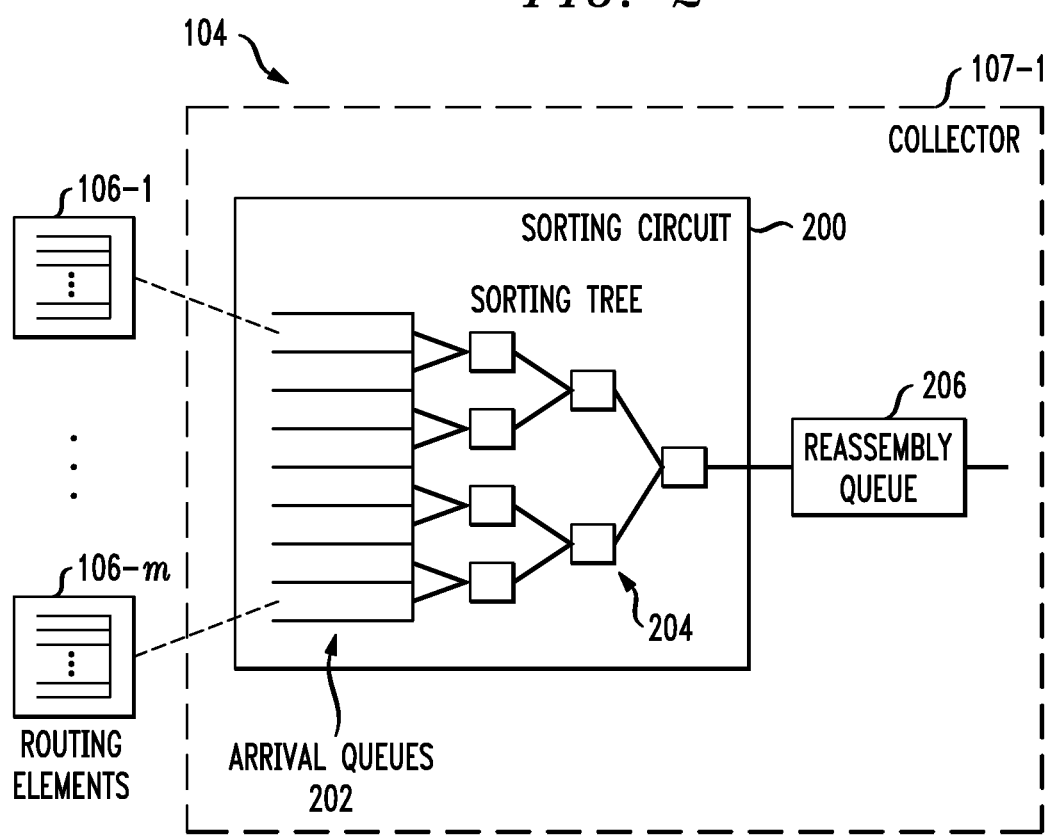
FIG. 2 is a more detailed view of a portion of a switch fabric implemented in a particular network device of the FIG. 1 network.

Referring now to FIG. 2, portions of the switch fabric 104 of network device 102-1 are shown in greater detail. The portions shown in this figure include the routing elements 106-1 through 106-m, and a given one of the collectors 107-1. The collector 107-1 has inputs coupled to respective outputs of the routing elements 106. It is assumed in this embodiment that the other collectors 107-2 through 107-m are each configured in a manner similar to that shown for collector 107-1 in the figure.

The collector 107-1 comprises m arrival queues 202 each configured to receive a stream of cells from one of the routing elements 106, a sorting tree 204 configured to reorder the cells in the streams of cells received by the respective arrival queues 202 into a single stream of reordered cells utilizing a parallel merge sort, and a reassembly queue 206 configured to store the single stream of reordered cells for subsequent reassembly into packets. Although a parallel merge sort is assumed in this embodiment, other embodiments can use other types of merge sorts.

The sorting tree 204 may be implemented at least in part in the form of one or more systolic arrays, or other types of processing circuitry.

The reassembly process will also generally involve additional streams of reordered cells generated by respective ones of the other collectors 107-2 through 107-m. This reassembly process is assumed to be implemented outside of the switch fabric 104 in the present embodiment, but in other embodiments may be at least partially implemented within the switch fabric.

The sorting circuit 200 imposes no constraints on the distributors 105 and therefore avoids the previously-described significant delay introduced in conventional arrangements that require use of uniform frames or impose other constraints on how the cells can be sent through the switch fabric.

As indicated above, the sorting circuit 200 in the present embodiment performs a parallel merge sort on multiple streams of cells received from respective ones of the routing elements 106. The overall cell reordering functionality implemented in the collectors 107 can be configured to guarantee that for each distributor-collector pair, cells leave the collector in the same order that they were sent from the distributor, although cells from different distributors may be intermixed as they leave the collector.

The parallel merge sort performed by sorting circuit 200 takes advantage of a property implemented in switch fabric 104 that cells are forwarded by the distributors in a designated order, illustratively a linear order, with the order being indicated by keys associated with respective cells in the distributors. Accordingly, the parallel merge sort is not a full sort operation, but is instead a merge sort of previously sorted streams. In other words, this embodiment limits the amount of rearrangement of cells within the switch fabric 104 in a manner that simplifies reordering at the collectors.

It is assumed that each stream of cells arriving at the collector 107-1 is presorted using the above-noted keys that are assigned to respective cells as those cells are forwarded by each distributor to the routing elements. Given a pair of streams arriving at the collector, the sorting tree 204 merges them into a single stream by repeatedly outputting the earlier of two head-of-stream cells based on the keys associated with those cells. More generally, the sorting tree 204 combines an arbitrary number of presorted streams to yield a single sorted stream.

Another feature of the sorting tree 204 is that it is configured to eliminate any dependency of comparison results from one level of the tree to the next. The critical timing path therefore includes only a single compare operation, rather than a chain of multiple compare operations from the root all the way up to the incoming leaves. All merge decisions can be made locally at each node of the sorting tree 204. If there is at least one entry available at a given node, the node advances the result of its compare operation, and otherwise it holds up and does not consume an entry from one of its input nodes.

The sorting circuit 200 is also configured to stop outputting cells if some intermediate cell or cells has not yet arrived, and to flush stored cells to the reassembly queue 206 when it determines that there are no missing cells. The sorting circuit 200 therefore is able to detect situations in which no cell should be output at a given merge decision point because an earlier cell in sequence order may not have arrived yet, and is also able to avoid erroneously waiting for a cell that does not exist.

The sorting circuit 200 is readily implementable in hardware and may be configured to have a throughput of one cell per clock cycle of a clock signal of the switch fabric 104. This allows the switch fabric to be utilized in network devices that operate at very high line rates, such as a line rate of 1 terabit per second (Tb/s) in which a 512-bit cell arrives every 500 picoseconds (ps).

For simplicity of further description of the sorting circuit 200 below, it is assumed that traffic arriving at the switch fabric 104 is stochastically admissible, so that no collector is overloaded in expectation. It is also assumed that the throughput of the switch fabric 104 is slightly larger than the arrival rate, by a factor of $\alpha > 1$. This is referred to herein as a speedup factor of the switch fabric.

There is no guarantee that traffic in practice will be admissible. Since the distributors 105 in this embodiment do not coordinate with one another, the distributors may jointly send traffic to a given collector 107 that exceeds its departure capacity. This will cause queues in the routing elements and collectors to grow. However, congestion control may be used to signal distributors to stop sending cells under such conditions. Examples of congestion control functionality that may be incorporated into the switch fabric 104 will be described elsewhere herein.

Given the assumed fabric speedup $\alpha > 1$, cell size s may be expressed as:

$$s := \alpha C \tau,$$

where C is the maximum data rate in bits per second arriving at a distributor 105 or leaving a collector 107 and $\tau$ is the cycle time of the SRAM used to implement the queues.

Assuming the links of the meshes 108 operate at a data rate L much less than C, the number of links m entering or leaving a switch fabric element is then $$m := \alpha C/L$$

to ensure an aggregate bandwidth of $\alpha C$. The frame interval F is now both m cycles and the time to send a cell at rate L:

$$F = s/L = m\tau.$$

The C bandwidth translates to a maximum arrival or departure rate at distributor or collector of $$r = m/\alpha$$

cells within a frame interval.

Nominal values for these exemplary operating parameters in one embodiment of the switch fabric 104 are C=1 Tb/s, $\alpha=1.28$, $\tau=400$ ps, and L=10 gigabits per second (Gb/s). These yield a cell size s=512 bits; the number of distributors, routing elements, and collectors as m=128; a frame interval F=51.2 ns; and a maximum arrival and departure rate of r=100 cells per frame interval. These particular values are examples only, and numerous other values can be used. Also, different operating parameters may apply in other embodiments of the switch fabric.

An arrival process may be used to model the manner in which cells arrive at each distributor during each frame interval. The arrival process is considered stochastically admissible if the arrival distributions at distinct frame times and at distinct distributors are independent, and if at every frame time the expected number of cells destined for a specific collector is at most r. By way of example, assume that possibly time-varying numbers $\rho_{ik} \geq 0$ with $\Sigma_i \rho_{ik} \leq 1$ are given. The process where each cell arriving at distributor i has destination collector k with probability $\rho_{ik}$ is stochastically admissible. So is the process where all r cells have the same destination collector k with probability $\rho_{ik}$.

A random-consecutive frame-filling strategy implemented in each of the distributors 105 may be as follows. Given $p \leq m$ cells $c_1, \ldots, c_p$, the distributor chooses a random integer t, places the full cells in slots $c_{t+1}, \ldots, c_{t+p}$, where the slot indices are taken mod m, and places empty cells elsewhere. This exemplary frame-filling strategy may be used as a basis for further analysis below and has the advantage that it requires a random choice only once per frame interval.

Assuming that the arrival process is stochastically admissible, routing-element queues are initially empty, and routing-element queues are unbounded, congestion is never signaled. It can be shown that there is a constant $\kappa > 0$ (depending on $\alpha$) such that at any frame time and for any collector:

1. If distributors use the random-consecutive frame-filling strategy, the probability that any single routing-element queue contains more than l cells is at most $\kappa/\alpha^l$.

2. The probability that the total number of cells in all routing-element queues exceeds rl is at most $\kappa/\alpha^l$.

Simulations performed on embodiments of the present invention show routing queue lengths somewhat smaller than the bound given above. For example, with $\alpha=1.28$, the probability that routing-element queue lengths exceed length l is at most about $0.62^l$, whereas $1/1.28 \approx 0.78$.

The cell reordering process implemented in switch fabric 104 will now be described in greater detail. As discussed above, cells may arrive at a given collector 107 out of order if routing-element queues have different occupancies.

Consider a stream of cells arriving at the switch fabric 104 with a specific collector 107 as its destination. Each distributor 105 takes its arriving stream of packets and splits it into m streams, one per routing element 106. Each routing element merges m incoming streams, and then sends the resulting stream to the collector. The task for the collector is to merge its m input streams into a single stream to be sent to the reassembly queue 206, with the requirement that the cells arriving from a specific distributor are in the same order as sent from the distributor.

This task is accomplished in the FIG. 2 embodiment using a parallel merge sort performed on multiple streams of cells. Each cell is annotated with a key comprising three fields: the frame time that the cell left the distributor, the index of the distributor, and the arrival index of the cell within its frame, in order from most significant to least significant. This three-field key provides a total linear order on cells, in that a cell c precedes a cell c', c<c', if the key of c is lexicographically less than the key of c'.

It should be noted that the term "key" as used herein is intended to be broadly construed, so as to encompass any information that is associated with a particular cell in a distributor so as to establish a particular order of cells forwarded by that distributor. It may comprise, for example, a sequence number or other information inserted by the distributor into a header of a given cell, although a wide variety of other types of cell annotation may be used in other embodiments.

Whenever multiple streams are merged in a collector, the linear order established by key annotation of cells at the distributors should be maintained. As a result, when cells are sent to the reassembly queue 206 at the collector, all cells with a particular frame time will appear together as a block. Within this block all cells from a specific distributor will appear together as a subblock, and within a subblock they are ordered by arrival at the distributor. Alternative arrangements are possible. For example, interchanging the significance of distributor index and arrival index in the lexicographic comparison would also work, with an altered output order.

Maintaining the linear order is straightforward at a routing element. At each frame time, all arriving cells have the same frame time and at most one cell arrives from each distributor, so the only requirement is that cells be added to queues ordered by distributor index.

The sorting circuit 200 is configured to maintain the established linear order at the collector. As noted above, the sorting circuit comprises m arrival queues 202 and the sorting tree 204.

Each arrival queue 202 is associated with an upstream routing-element queue and stores cells temporarily as they arrive from the upstream queue. Logically, the sorting tree 204 in this embodiment is implemented as a binary tree, although other types of sorting trees can be used. The leaves of the sorting tree correspond to respective ones of the arrival queues. A given internal node of the sorting tree has two inputs, received from its children, and one output, sent to its parent. Each internal node stores a single cell, and has access to the cells of its two children. A cell may be full or empty, i.e. with or without payload, but in either case the cell has an associated key with which it was annotated in one of the distributors. The sorting tree in this embodiment is balanced, assuming for simplicity that m is a power of two. The tree produces at its output a single sorted stream of cells from the cells in the arrival queues, as will now be described.

Every cycle, a cell is requested from the root of the tree. When a cell is requested from the root or other node, the node responds with its stored cell. To replace the cell, the node compares the keys of the cells of its two children, and requests the node with the smaller key to send its cell, which becomes the new stored cell. If the two children correspond to respective ones of the arrival queues 202, the keys of the two cells at the heads of these respective queues are compared, and the smaller is deleted from its queue and becomes the new stored cell. The cell provided by the root of the tree is sent to the reassembly queue 206, as long as that cell is not empty.

Figure 3:
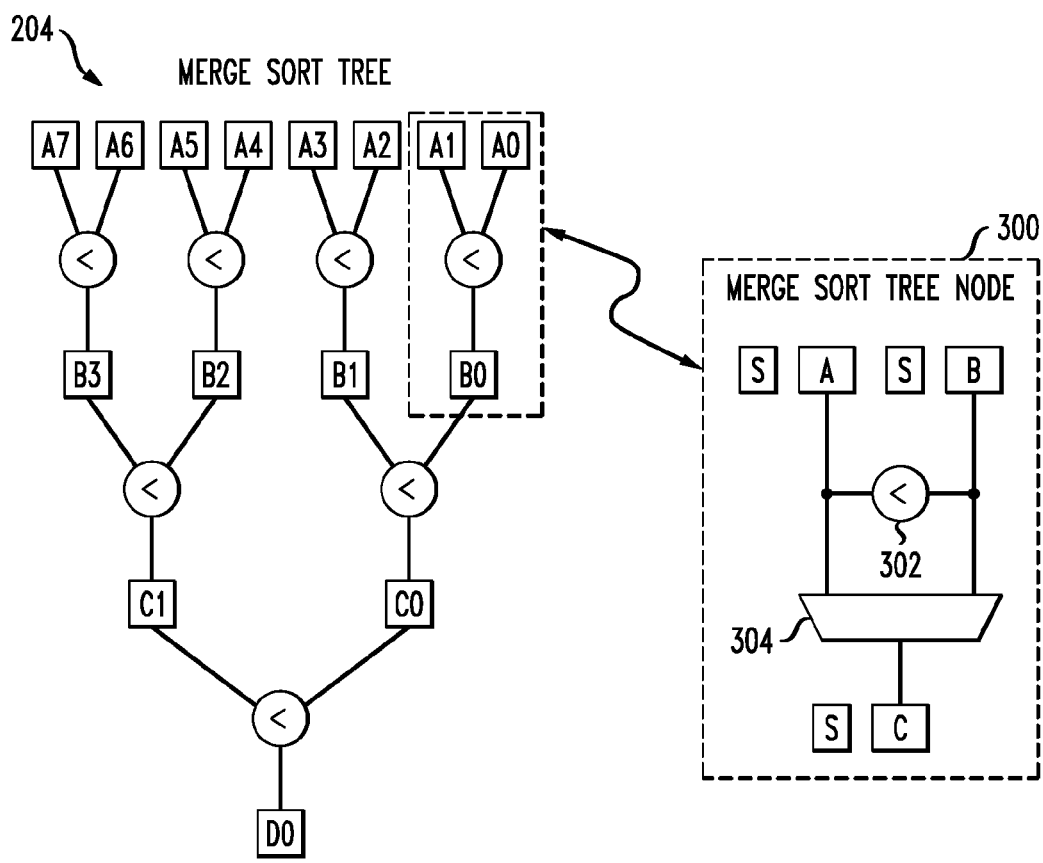
FIG. 3 shows one possible implementation of a sorting tree in a collector of the FIG. 2 switch fabric.

FIG. 3 shows one possible implementation of the sorting tree 204. In this embodiment, a given node 300 of the sorting tree may be viewed as comprising three registers denoted A, B and C, respectively, each having an associated state, S. The state describes whether the contents of the corresponding register should be considered valid or empty. The registers A and B are input registers of the node 300 and register C is an output register of the node 300.

Node 300 is arranged with other similarly-configured nodes in a multi-level tree structure in which the outputs of one level become the inputs to the next level. A first level of the sorting tree 204 in this embodiment has input registers A0 through A7 and output registers B0 through B3. At the next level of the tree, the input registers are B0 through B3 and the output registers are C0 and C1. Similarly, at the next level of the tree, the input registers are C0 and C1, and the output register is D0. Thus, in this embodiment, the output registers of the nodes at one level also serve as input registers for nodes at the next higher level.

In the node 300, a comparator 302 determines the order of the contents of registers A and B and controls a multiplexer 304 that feeds register C. If register C is empty or will become empty because its content will advance as selected input to the next node, then the node can choose the earlier of A or B and load register C.

It should be understood that the particular sorting tree configuration shown in FIG. 3 is presented by way of illustrative example only. Other sorting trees can use other arrangements of registers and other circuitry, and other types and arrangements of nodes. For example, although a balanced binary sorting tree is assumed is some embodiments, other embodiments can use other types of sorting trees implementing other types of merge sort algorithms.

In one possible alternative sorting tree, the A, B and C registers of the node 300 may each be implemented using two registers arranged in a first-in first-out (FIFO) configuration. Each node can then advance its content if there is an empty FIFO entry available in register C independently of downstream nodes advancing content.

The sorting circuit 200 is configured to ensure that cells are emitted in sorted order, and more particularly that no cell is emitted from the sorting tree 204 if a preceding cell has not yet arrived at the sorting circuit. This is accomplished in the present embodiment by associating with each arrival queue 202 a register to store what is referred to herein as an empty-cell key. At any time, this key should precede the key of any cell that can subsequently arrive at the arrival queue. If an arrival queue is empty, its parent bases its comparison on the empty-cell key instead of the head-of-queue key. If the parent requests a cell from an empty arrival queue, the arrival queue creates an empty cell whose key is the empty-cell key, and sends that cell to the parent. Similarly, if a parent of an interior node requests a cell from a child storing an empty cell, the empty cell is sent to the parent. Hence empty cells can propagate up the tree all the way to the root.

A full cell at a node is blocked if its sibling node stores an empty cell having a smaller key. Clearly, while a cell is blocked, it is not sent to the parent of the node. Thus the empty cells in this embodiment are utilized to facilitate maintenance of sorted order. More particularly, the sorting tree emits cells in sorted order, as long as empty cells emitted from the root are discarded.

It can be verified that the cell c stored at a given node of the sorting tree 204 precedes every other full cell in the subtree rooted at the node, including all cells currently in arrival queues or that will arrive in the future, although it is possible that some empty cell in the subtree has the same key as c. Hence the cell stored at the root of the tree precedes every full cell currently in the tree or that will ever arrive in the future.

In addition, the sorting circuit 200 is configured to ensure that cells are eventually emitted from the sorting tree 204, even if no further cells arrive. In other words, the sorting circuit ensures that blocked cells eventually become unblocked.

As described previously, a routing element sends an empty cell to a collector only if the corresponding routing-element queue is empty. Thus if an empty cell does arrive, the collector can infer that any subsequent cell received from the same routing element will have a frame time after the current frame. The arrival queue should maintain its empty-cell key as the larger of two values, namely, the key of the last full cell sent to the arrival-queue parent, or a key with the frame time that was current when the last empty cell arrived from the routing element. The latter key is also referred to herein as a marker key.

To make sure that no cell remains blocked, at every cycle, every internal node with an empty cell should generate a request to its child having the smaller key to send its cell, which as usual replaces the empty cell. At the next frame time, a full cell may have arrived which will propagate up the tree. If not, an empty cell with a marker key will propagate up the tree, which necessarily has a key larger than any full-cell key in the tree. Some embodiments are configured such that any blocked cell will become unblocked in about a frame interval. This implies that all cells are eventually emitted, even with no subsequent arrivals of cells to the collector.

The arrival queues 202 store cells until they can be admitted into the sorting tree 204. The required size of the arrival queues depends upon the past discrepancy of queue occupancies at routing elements. To see this, assume a routing-element queue Q has l cells in it and the other routing-element queues for the same collector are empty. Further assume that cell c arrives next at Q with other cells subsequently arriving at the other routing-element queues. In the l frame times before c moves to its collector arrival queue, each of the other routing-element queues could send a cell to each of the other collector arrival queues. None of these cells can leave the sorting circuit 200 until c arrives at the collector, forcing arrival occupancy of approximately l. Since the sorting circuit drains at a fixed rate, occupancy can potentially be twice as large. More particularly, if δ bounds the maximum difference between routing-element queue occupancies at any time, then the occupancy of the arrival queues 202 is at most 2δ+1.

There is no worst-case bound on routing-element queue discrepancies. Furthermore the probabilistic estimates described above do not immediately give a probabilistic bound on arrival-queue lengths, since the estimates bound arrival queue occupancy on worst-case routing-element queue discrepancy over time. However, it is possible to obtain probabilistic arrival-queue occupancy bounds directly.

For the analysis, it is assumed that the sorting tree can emit a cell from the root every cycle, with a frame time occurring at integer multiples of m. The nodes of the sorting tree operate in parallel with one another and take a single cycle to move a cell from a child to a parent. Choosing the cells to move may require a computation along a path of length $\log_2 m$ from root to leaf, and potentially along similar paths rooted at empty nodes. For now, it is assumed that this computation can happen within a cycle, although this assumption will be removed later.

For a cell c, let $\alpha(c)$ be the time that the cell departs the routing-element queue and is added to an arrival queue, with the transfer assumed to take no time; $\alpha(c)$ is a multiple of m. Let d(c) be the time that the cell departs the arrival queue and enters the sorting tree. The number of cells in c's arrival queue at time d(c) is at most $\lfloor (d(c)-\alpha(c))/m \rfloor$, since any such cell must have arrived after c and cells arrive at most once per frame interval.

Assuming that all queues are initially empty and the arrival process is stochastically admissible, it can be shown that, for some constant κ' that is independent of m and l but depends upon α, and for any cell c, $$Pr((d(c)-a(c))/m \geq l) < \kappa' m^2/\alpha^l.$$

More explicitly, if the arrival queue lengths are sampled when cells move from the arrival queue to the tree (i.e. at time d(c) for each cell c), then the probability that the length exceeds l decreases exponentially with l, albeit with probability somewhat higher than for routing-element queue lengths.

As described above, the sorting circuit 200 is configured to synchronize cell motion along a path from root to leaf of the sorting tree 204. Alternative sorting circuits may be used that require only local synchronization.

It was indicated previously that one example of such an alternative sorting circuit has a sorting tree in which each node register comprises two registers configured in FIFO arrangement, with each of the registers holding a cell, either full or empty. In this way, cells can advance within the tree without depending on cells leaving openings further downstream within the tree. If at least one of the two registers is empty, then the node can advance a node from one of its two input nodes regardless of whether its output is advanced in its adjacent downstream node. The sorting tree maintains the property that both of the cells at a node of the tree should precede all the other cells in the subtree rooted at the node, including future arrivals in the arrival queue, though it is possible that an empty cell in the subtree has the same key as the later of the two cells.

Some consolidation of empty cells is possible since two cells are stored in a node. If two empty cells have distinct keys, the earlier key should be replaced with the later key; this maintains the desired property. Similarly, if a node contains a full cell and an empty cell, the key of the empty cell should be replaced with that of the full cell, if the empty cell had an earlier key.

In operation, each node makes the key of its earlier cell available to its parent. Every cycle, every node storing an empty cell requests a cell from one of its children, as before. The requested cell obtained from the child replaces the empty cell. Simultaneously the node may be sending the cell with earlier key to its parent. These transactions can involve different registers, since either both registers have empty cells with the same key, or the register with a full cell is sent to the parent, and the register with an empty cell receives a cell from a child. Hence only synchronization between adjacent levels in the tree is required in this alternative sorting circuit. Also, for any sequence of arrivals of cells to arrival queues, the alternative sorting circuit emits a full cell no later than would the previously-described sorting circuit 200. Similarly, at any time any arrival queue in the alternative sorting circuit is at most as long as it would be in the sorting circuit 200. It should be appreciated that this is just one alternative sorting circuit, and numerous other alternatives to the sorting circuit 200 may be utilized.

As indicated above, congestion control functionality may be incorporated into the switch fabric 104, as will now be described. Since distributors choose cells to send independently of other distributors, cells may arrive at a collector at a rate faster than the departure capacity of the collector. In this case, switch fabric queue occupancy will grow, either at the reassembly queue of the collector or at a routing-element queue. Such situations can be addressed using a congestion signal to stop distributors from sending traffic to the collector until the corresponding queues can drain.

Requisite queue sizes are in part determined by the response delay at a distributor to a congestion signal, i.e. the time required for the distributor to start or stop sending cells once signaled by a routing element or collector. The response delay may be substantially more than a frame time, perhaps tens of frame times, as a result of propagation delays, VLSI-level pipelining at the distributor, and memory access latency. Assume the response delay is d frame times and congestion is signaled. In the worst case all m distributors could be sending all their cells to the same collector. Hence each routing-element queue needs at least dm cells of headroom. In fact, having multiple distributors sending traffic to the collector is typical of an overload situation. Similarly, as a queue empties, the congestion signal should be cleared roughly d frame times before the queue is empty, so that the queue maintains occupancy if traffic is available.

It is possible for queues to grow arbitrarily large even with stochastically admissible traffic. A false congestion event of this type may cause congestion to be signaled. Congestion signals cause a slight loss in throughput to a collector. However, the probability of a false congestion event decreases exponentially in the queue size. Hence with sufficiently large queues throughput loss is negligible.

The sorting-circuit arrival queues do not need to use congestion signaling. Instead, if any arrival queue occupancy approaches the queue size, a backpressure signal to the upstream routing-element queue may be used to cause the routing-element queue to temporarily stop sending cells until the arrival queue drains. Assuming that a collector and a distributor are collocated on the same line card, the backpressure signal is easily implemented as an annotation bit on the cell sent from distributor to routing element, with a delay of a couple of frame intervals. The backpressure signal may cause the routing-element queue to stop draining, and perhaps to grow, eventually signaling congestion.

The above-described switch fabrics with collector-based cell reordering functionality in the illustrative embodiments can advantageously avoid the delays and configuration restrictions associated with conventional arrangements such as those that impose the use of uniform frames or other constraints on how the cells can be sent through the switch fabric. The resulting switch fabrics can be utilized in high-speed routers and other network devices that operate at line rates on the order of 1 Tb/s.

As mentioned above, embodiments of the present invention may be implemented at least in part in the form of one or more software programs that are stored in a memory or other computer-readable storage medium of a network device or other processing device of a communication network. As an example, network device components such as portions of the switch fabric 104 and controller 110 may be implemented at least in part using one or more software programs.

Numerous alternative arrangements of hardware, software or firmware in any combination may be utilized in implementing these and other system elements in accordance with the invention. For example, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

It should again be emphasized that the embodiments described above are for purposes of illustration only, and should not be interpreted as limiting in any way. Other embodiments may use different types of network, device and switch fabric configurations, depending on the needs of the particular application. Alternative embodiments may therefore utilize the techniques described herein in other contexts in which it is desirable to provide efficient cell reordering in a switch fabric. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
   a switch fabric;
   the switch fabric comprising:
      a plurality of distributors;
      a plurality of routing elements each having inputs coupled to respective outputs of multiple ones of the distributors; and
      a plurality of collectors each having inputs coupled to respective outputs of multiple ones of the routing elements;
   wherein at least a given one of the collectors comprises a sorting circuit configured to reorder streams of cells received from respective ones of the routing elements into a single reordered stream of cells utilizing a merge sort; and
   wherein the sorting circuit comprises:
      a plurality of arrival queues each configured to receive a corresponding stream of cells from one of the routing elements;
      a sorting tree configured to reorder the cells in the streams of cells received by the respective arrival queues into the single reordered stream of cells; and
      a reassembly queue configured to store the single reordered stream of cells for subsequent reassembly into packets.

2. The apparatus of claim 1 wherein the switch fabric comprises m distributors, m' routing elements, and m collectors.

3. The apparatus of claim 2 wherein the switch fabric further comprises:
   a first mesh comprising m×m' links each configured to connect one of the distributors to one of the routing elements; and
   a second mesh comprising m×m' links each configured to connect one of the routing elements to one of the collectors.

4. The apparatus of claim 1 wherein the sorting circuit has a throughput of one cell per clock cycle of a clock signal of the switch fabric.

5. The apparatus of claim 1 wherein the sorting circuit is configured to ensure that cells received from a particular one of the distributors leave the collector in the same order that they were sent from the distributor.

6. The apparatus of claim 1 wherein each of the distributors is configured to annotate each of the cells that it forwards to one of the routing elements with a key so as to establish an order of cells forwarded by the distributor.

7. The apparatus of claim 6 wherein the keys associated with respective ones of the cells are utilized by the merge sort in the sorting circuit of the given collector to maintain the order established by the distributor.

8. The apparatus of claim 7 wherein each of the keys comprises a plurality of fields including at least a subset of:
a first field indicating a frame time associated with forwarding of the cell by the distributor;
a second field indicating an index of the distributor; and
a third field indicating an arrival index of the cell within its corresponding frame.

9. The apparatus of claim 8 wherein the single stream of reordered cells comprises a plurality of frames in which all cells having the same frame time are arranged together as a block, and within a given such block all cells from a particular one of the distributors are arranged together as a subblock, and within a given such subblock all cells are ordered based on arrival at the distributor.

10. The apparatus of claim 1 wherein the sorting circuit is configured such that no cell is emitted from the sorting circuit as long as it remains possible that an earlier cell has not yet arrived at the sorting circuit.

11. The apparatus of claim 1 wherein the sorting circuit is configured such that all arriving cells are guaranteed to eventually be emitted from the sorting circuit.

12. The apparatus of claim 1 wherein the switch fabric comprises:
at least one line card;
the line card comprising:
input stage processing circuitry implementing at least a subset of the distributors;
intermediate stage processing circuitry implementing at least a subset of the routing elements; and
output stage processing circuitry implementing at least a subset of the collectors.

13. The apparatus of claim 12 wherein the input stage processing circuitry of the line card is further configured to separate an input packet stream into cells for delivery to the distributors, and the output stage processing circuitry of the line card is further configured to reassemble reordered streams of cells from respective ones of the collectors into an output packet stream.

14. The apparatus of claim 1 wherein the sorting tree is implemented as a multi-level binary tree structure comprising a plurality of nodes, each node comprising:
a first input register storing first content;
a second input register storing second content;
a comparator coupled to the first input register and the second input register;
a multiplexer coupled to the comparator; and
a third output register coupled to the multiplexer;
the comparator being configured to determine an order of the first content and the second content and to control the multiplexer to load a selected one of the first content and the second content in the third output register.

15. A network device comprising the apparatus of claim 1.

16. A method comprising:
distributing cells in a switch fabric from a plurality of distributors to a plurality of routing elements;
routing the cells from the routing elements to a plurality of collectors; and
reordering streams of cells received in a given one of the collectors from respective ones of the routing elements into a single reordered stream of cells utilizing a merge sort performed by the given collector;
wherein reordering stream of cells in the given collector comprises:
receiving, in each of a plurality of arrival queues, a corresponding stream of cells from one of the routing elements;
reordering the cells in the in the streams of cells received by the respective arrival queues into the single reordered stream of cells utilizing a sorting tree; and
storing the single reordered stream of cells in a reassembly queue for subsequent reassembly into packets.

17. The method of claim 16 further including the steps of:
separating an input packet stream into cells for delivery to the distributors; and
reassembling reordered streams of cells from respective ones of the collectors into an output packet stream.

18. The method of claim 16 further comprising:
establishing an order of cells forwarded by each distributor by annotating each of those cells with respective keys; and
maintaining the order established by the distributor in the merge sort performed by the given collector.

19. The method of claim 18 wherein each of the keys comprises a plurality of fields including at least a subset of:
a first field indicating a frame time associated with forwarding of the cell by the distributor;
a second field indicating an index of the distributor; and
a third field indicating an arrival index of the cell within its corresponding frame.

20. The method of claim 19 wherein the single stream of reordered cells comprises a plurality of frames in which all cells having the same frame time are arranged together as a block, and within a given such block all cells from a particular one of the distributors are arranged together as a subblock, and within a given such subblock all cells are ordered based on arrival at the distributor.

21. An article of manufacture comprising a non-transitory computer readable storage medium having embodied therein executable program code that when executed by a network device causes the network device to perform the method of claim 16.

22. A network device comprising:
a processor;
a memory coupled to the processor;
network interface circuitry configured to support communication between the network device and one or more additional devices of a communication network; and
a switch fabric;
the switch fabric comprising:
a plurality of distributors;
a plurality of routing elements each having inputs coupled to respective outputs of multiple ones of the distributors; and
a plurality of collectors each having inputs coupled to respective outputs of multiple ones of the routing elements;
wherein at least a given one of the collectors comprises a sorting circuit configured to reorder streams of cells received from respective ones of the routing elements into a single reordered stream of cells utilizing a merge sort; and
wherein the sorting circuit comprises:
a plurality of arrival queues each configured to receive a corresponding stream of cells from one of the routing elements;

a sorting tree configured to reorder the cells in the streams of cells received by the respective arrival queues into the single reordered stream of cells; and
a reassembly queue configured to store the single reordered stream of cells for subsequent reassembly into packets.

* * * * *